April 9, 1963   R. G. PROCOPIO   3,084,418
METHOD OF ENCAPSULATING ELECTRICAL STATORS
Filed March 3, 1959

INVENTOR
RALPH G. PROCOPIO
BY
Henry Huff
ATTORNEY

United States Patent Office 3,084,418
Patented Apr. 9, 1963

3,084,418
METHOD OF ENCAPSULATING
ELECTRICAL STATORS
Ralph G. Procopio, East Northport, N.Y., assignor to Sperry Rand Corporation, Great Neck, N.Y., a corporation of Delaware
Filed Mar. 3, 1959, Ser. No. 796,822
1 Claim. (Cl. 29—155.5)

This invention relates to a method of encapsulating the wound stator of an electrical device in an assembly with a housing. The electrical component of the assembly may be the stator of a motor, generator, signal device or equivalent part with a radially slotted core having single, double or more phase windings thereon.

The object of the present invention is to provide an assembly of this character wherein expansion of the potting material or resin in the housing and stator during operation does not result in engagement between the material and the rotational or armature component of the electrical device. By my improved method, the bore of the potting material or resin is recessed in the assembly with respect to an axial opening in the housing and the aligned bore of the stator so as to provide the necessary room for the potting material or resin to expand in both the housing and the slots in the stator core without contacting he armature component of the electrical device.

In the practice of the improved method, the axial opening in the assembled stator and housing is closed by an elastic tube whose outer surface is forced partially within the radial slots in the stator core and within the spaces between the stator and the respective end walls of the housing. The conditioned assembly is then filled with an insulative potting material or resin to encapsulate the wound stator.

Figure 1:
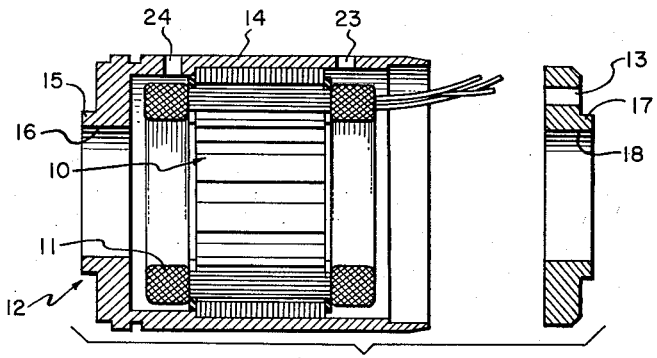
Figure 2:
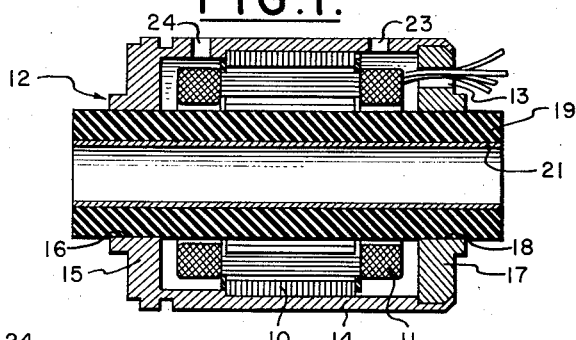
Figure 3:
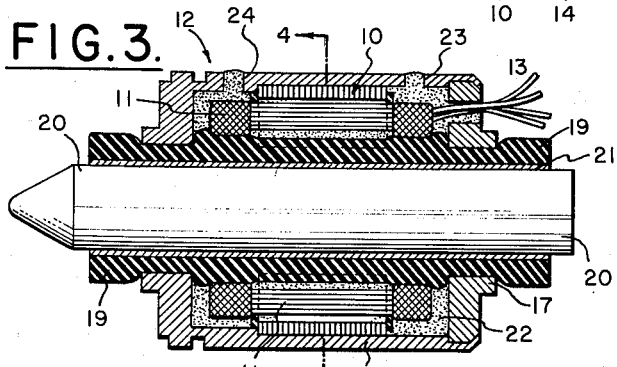
Figure 4:
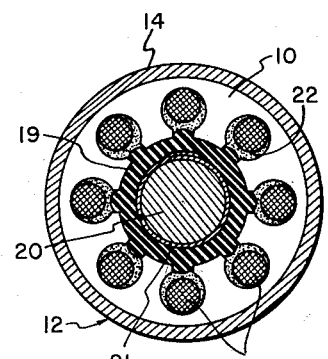
Figure 5:
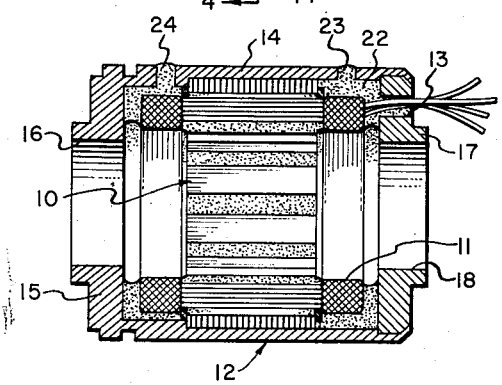

A complete understanding of the invention may be had by reference to the following detailed description when read in conjunction with the appended drawings, in which, FIG. 1 is an axial cross section and exploded view of an illustrative stator and housing in unassembled relation as utilized in the practice of the improved method, FIG. 2 is a view similar to FIG. 1 in which the components are shown in assembled relation with the assembly closed axially by an expandable tube, FIG. 3 is a view similar to FIG. 1 in which the tube is expanded within the axial opening and the potting step of the method has been completed, FIG. 4 is a cross section taken on lines 4—4, of FIG. 3, and FIG. 5 is a view similar to FIG. 1 showing the finished assembly with the stator encapsulated within the housing.

As shown in the drawings, the illustrative stator 10 is provided by a radially slotted core formed of connected laminations.

The housing of the assembly in which the stator 11 is encapsulated is indicated generally at 12. As shown, the housing part 12 is provided by a cylindrically shaped piece 14 having an end wall 15 with a bore 16 of a diameter substantially corresponding to the inside diameter of the pole faces of the stator 10. The piece 14 includes a flange at its open end adapted to receive a closing end part 17 with a bore 18 of the same diameter as the bore 16. In assembling the housing, the piece 14 and part 17 are joined as shown in FIG. 2 by turning the edge at the open end of the piece 14 over the bevelled rim of the part 17. Part 17 constitutes the other of the end walls of the housing 12. The internal cylindrical configuration of the piece 14 is such as to locate the core in the assembly with the stator and bores in axial alignment. The housing utilized in the improved method provides by a mold whose connected parts may be separated after encapsulation of the stator. It will be understood that the electrical device when completed is provided with a rotor (not shown) that cooperates with the stator and is mounted in the housing on a shaft having bearing assemblies located in the respective finished bores 16 and 18 of the housing.

As shown in FIG. 2, the first step of the improved method consists in assembling the stator within the housing with the bores of the housing end walls and the pole face opening in the stator in spaced axial alignment. In this step, the wound stator is fitted in the open end of the cylindrical piece 14 and the housing is assembled by securing the end part 17 in position on the piece 14. Before completing the assembly, the terminal wires of the windings 11 are threaded through an opening 13 in the end wall part 17 of the housing.

After the stator and housing components are assembled, the assembly is threaded with an elastic tube 19 that extend through the bores in the housing end walls and through the pole face opening in the stator. The tube 19 shown in its threaded condition in FIG. 2 may be formed of suitable relatively soft material, such as rubber, with an outside diameter corresponding to the inside diameter of the bores in the housing and to the pole face opening in the stator.

The tube 19 is then expanded radially to force the outer surface thereof partially within the radial slots in the stator as shown in FIG. 4, partially within the space between the stator and the respective housing end walls as shown in FIG. 3 and against the bores in the respective housing end walls to close the axial opening in the assembly. This step of the method may be performed by the insertion of a rod 20 in the bore of the tube 19, the diameter of the rod being greater than the inside diameter of the bore in the tube. To reduce frictional resistance between the rod and tube elements, I prefer to line the bore of the tube with Teflon sheeting 21 and to insert a Teflon rod in the lined bore of the tube in the performance of this step of the improved method. FIGS. 3 and 4 show the relation of the parts after the completion of this of the step method, the rod 20 extending through the tube 19, the sheeting 21 being between the tube 19 and the rod 20, and the outer surface of the tube being expanded so as to prevent the subsequently supplied fluid potting material from filling the axial portion of the assembly closed by the expanded elastic tube.

The encapsulating step of the method comprises filling the remaining space in the axially closed assembly of parts through an opening in the housing with a suitable insulative potting material or resin 22. In this step of the method, a suitable casting material such as Aritemp #201 produced by the Aries Laboratories, Inc. in heated and liquid condition is poured into the assembled parts under pressure if necessary through the openings 23, 24 to completely fill the space therein not occupied by the expanded tube 19. The material closes the openings 23, 24 as well as the openings 13 in the end wall part 17 through which the terminal leads extend as shown in FIG. 3. The wound stator is accordingly embedded in the potting material.

The noted potting material is cured in a suitable curing step which sets the potting material contained within the closed assembly. In this step, the assembly shown in FIG. 3, including the rubber tube 19 and rod 20, is placed in a suitable oven at the required temperature for the time necessary to set the material.

After curing and cooling, the radial force exerted on the elastic tube 19 is relieved by removing the rod 20. The tube with the Teflon sheet therein is then removed from the housing. In the finished assembly, as shown in FIG. 5, the surface of the set potting material extending along the axial bore of the housing conforms to the shape taken by the expanded tube 19. This provides sufficient room within the assembly for the potting material to expand as the device functions at its normal operating temperature.

While the invention has been described in its preferred embodiment, it is to be understood that the words which have been used are words of description rather than of limitation and that changes within the purview of the appended claim may be made without departing from the true scope and spirit of the invention in its broader aspects.

What is claimed is:

A method of encapsulating the radially slotted, wound stator of an electrical device in an assembly with a housing having bored end walls of equal diameters substantially corresponding to the inside diameter of the stator which comprises assembling the housing and stator with the stator between the housing end walls and with the bores of the housing end walls and the stator opening in spaced axial alignment, threading the housing and stator assembly with a rubber tube extending through the bores in the housing end walls and through the opening in the stator, lining the bore of the tube with Teflon sheeting, inserting a Teflon rod of a greater diameter than the inside diameter of the tube in the lined bore of the tube to expand the tube radially and force the outer surface thereof partially within the radial slots in the stator and, partially within the space between the stator and the respective housing end walls and against the bores in the respective housing end walls to close the axial opening in the assembly, filling the remaining space in the axially closed assembly with insulative potting material to encapsulate the stator, removing the expanding Teflon rod from the bore of the rubber tube, and removing the rubber tube and Teflon sheeting from the assembly.

References Cited in the file of this patent

UNITED STATES PATENTS

| | | |
|---|---|---|
| 1,925,892 | Apple | Sept. 5, 1933 |
| 2,573,126 | Andrus | Oct. 30, 1951 |
| 2,606,849 | Dantsizen | Aug. 12, 1952 |
| 2,668,925 | Bloser | Feb. 9, 1954 |
| 2,804,886 | White | Sept. 3, 1957 |
| 2,885,248 | White | May 5, 1959 |
| 2,958,927 | Kravats | Nov. 8, 1960 |
| 2,967,346 | McMaster et al. | Jan. 10, 1961 |
| 2,967,960 | Waldschmidt | Jan. 10, 1961 |